United States Patent
Li et al.

(10) Patent No.: US 11,144,790 B2
(45) Date of Patent: Oct. 12, 2021

(54) DEEP LEARNING MODEL EMBODIMENTS AND TRAINING EMBODIMENTS FOR FASTER TRAINING

(71) Applicant: Baidu USA, LLC, Sunnyvale, CA (US)

(72) Inventors: Baopu Li, Santa Clara, CA (US); Zhiyu Cheng, Sunnyvale, CA (US); Yingze Bao, Mountain View, CA (US)

(73) Assignee: Baidu USA LLC, Sunnyvale, CA (US)

( * ) Notice: Subject to any disclaimer, the term of this patent is extended or adjusted under 35 U.S.C. 154(b) by 81 days.

(21) Appl. No.: 16/600,148

(22) Filed: Oct. 11, 2019

(65) Prior Publication Data
US 2021/0110213 A1    Apr. 15, 2021

(51) Int. Cl.
*G06N 3/08*    (2006.01)
*G06F 17/15*    (2006.01)
*G06N 3/04*    (2006.01)
*G06K 9/62*    (2006.01)

(52) U.S. Cl.
CPC .......... *G06K 9/6267* (2013.01); *G06F 17/15* (2013.01); *G06K 9/6256* (2013.01); *G06N 3/04* (2013.01); *G06N 3/084* (2013.01)

(58) Field of Classification Search
None
See application file for complete search history.

(56) References Cited

U.S. PATENT DOCUMENTS

| | | | |
|---|---|---|---|
| 2018/0292784 A1* | 10/2018 | Nguyen | G02B 21/18 |
| 2020/0085382 A1* | 3/2020 | Taerum | G06T 7/30 |
| 2020/0170564 A1* | 6/2020 | Jiang | G06K 9/4628 |
| 2020/0175352 A1* | 6/2020 | Cha | G06N 3/0454 |
| 2020/0202216 A1* | 6/2020 | Martinez-Canales | G06N 3/08 |
| 2020/0234051 A1* | 7/2020 | Lee | G06N 3/0454 |
| 2020/0372246 A1* | 11/2020 | Chidananda | G06F 3/017 |
| 2020/0380675 A1* | 12/2020 | Golden | G06T 7/194 |
| 2020/0395117 A1* | 12/2020 | Schnorr | G16H 30/20 |

* cited by examiner

*Primary Examiner* — Idowu O Osifade

(74) *Attorney, Agent, or Firm* — North Weber & Baugh LLP

(57) ABSTRACT

Presented herein are embodiments of a training deep learning models. In one or more embodiments, a compact deep learning model comprises fewer layers, which require fewer floating-point operations (FLOPs). Presented herein are also embodiments of a new learning rate function, which can adaptively change the learning rate between two linear functions. In one or more embodiments, combinations of half-precision floating point format training together with larger batch size in the training process may also be employed to aid the training process.

20 Claims, 7 Drawing Sheets

600

Input an unlabeled image into the trained image classification model, which comprises:
- a convolution module comprising a convolution with a set of filters, a batch normalization operation, and an activation operation;
- a first residual module comprising at least two convolution modules separated by a max pooling layer;
- a second residual module comprising at least two convolution modules separated by a max pooling layer; and
- a fully connected layer

— 605

Output a label for the image — 610

FIG. 6

DEEP LEARNING MODEL EMBODIMENTS AND TRAINING EMBODIMENTS FOR FASTER TRAINING

BACKGROUND

A. Technical Field

The present disclosure relates generally to systems and methods for computer learning that can provide improved computer performance, features, and uses. More particularly, the present disclosure relates to systems and methods for improved deep learning models and improved training of deep learning networks.

B. Background

Deep learning (DL) has been widely applied in many different fields, such as computer vision, natural language processing, medical image processing, and so on. Increasingly, deep learning has formed a foundation for the relatively recent artificial intelligence/machine learning (AI/ML) revolution, which has impacted numerous industries and created several more. In most cases, the training process of a DL task is very long, even on modern advanced graphics processing unit (GPU) machines, such as NVIDIA® Tesla® V100 Tensor Core manufactured by Nvidia of Sunnyvale, Calif., or a Tensor Processing Unit (TPU) by Google of Mountain View, Calif. There is a great need to devise novel models and methods to accelerate the training process of a DL model to improve the efficiency as well as saving cost.

Consider, by way of example, deep learning text-to-speech (TTS) systems. Due to their complexity, developing a TTS system can be very labor intensive and difficult. Recent work on neural TTS systems has demonstrated impressive results, yielding pipelines with somewhat simpler features, fewer components, and higher quality synthesized speech. There is not yet a consensus on the optimal neural network architecture for TTS. Similar issues exist for other applications of deep learning systems that address different areas.

Accordingly, what is needed are systems and methods for improved deep learning models and for improved training of deep learning models.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

FIG. 6 depicts a method for using a trained model for image classification, according to embodiments of the present disclosure.

DETAILED DESCRIPTION OF EMBODIMENTS

Figure 1:
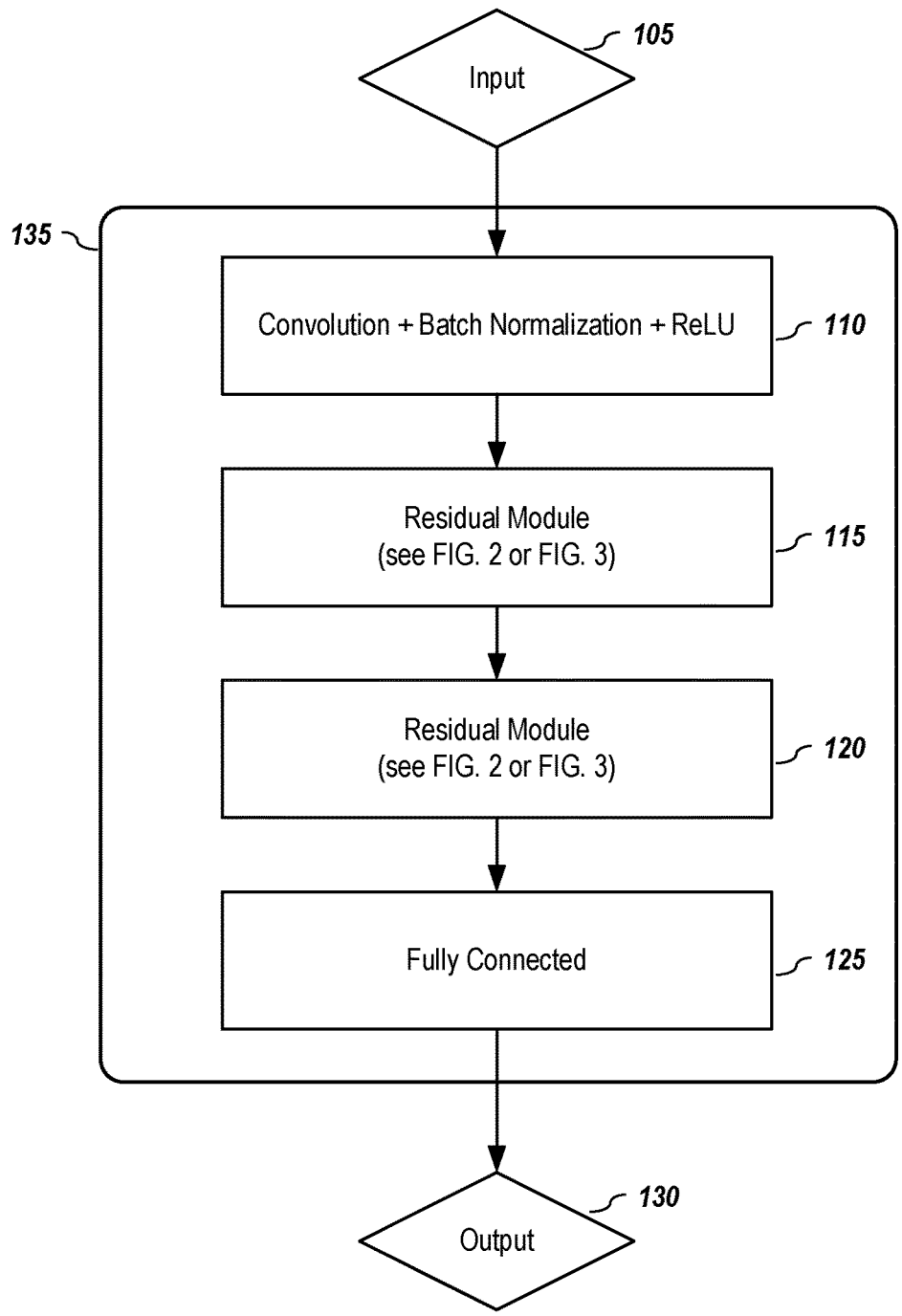
FIG. 1 depicts a slim or compact neural architecture designed with one or more residual modules, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. A "layer" may comprise one or more operations.

Any headings used herein are for organizational purposes only and shall not be used to limit the scope of the description or the claims. Each reference/document mentioned in this patent document is incorporated by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. General Introduction

Training a neural network typically means finding the best weights for a specific problem using a set of labelled data. With a given loss function to measure the performance of the weights among the large number of interconnections in each layer of a neural network, a back propagation (BP) method is generally used to reduce the loss function by iteration.

In most cases, training deep neural networks is very challenging. It typically requires expert knowledge and experience to properly train and obtain an optimal model. It also typically requires a lot of trials to find the best hyper-parameters, such as learning rate, batch size, momentum, and so on.

On typical image classification problems, such as ImageNet and CIFAR10, there has been a lot of work to improve the classification performance. However, the models used for these classification problems typically have very long training processes.

B. Compact/Slim Model Architecture Embodiments

To reduce training time, embodiments of a compact image classification model were developed. A goal was to design models that can be efficiently trained on image data but still have acceptable performance. One way to help reduce the training time is to make a slim/compact model; that is, a model that has fewer parameters and therefore requires fewer operations to train. However, reducing the model size tends to reduce its predictive accuracy. Accordingly, part of the difficulty is in determining ways to structure the model but still achieve good results.

An example novel deep learning compact or slim architecture is depicted in FIG. 1, in which the model has fewer layers and narrower width (e.g., fewer filters) than typical image classification models. Considering the possible gradient saturation problem in the backpropagation process of training for many deep network structures, a shortcut connection with identity output is also applied to the neural network module. In one or more embodiments, a shortcut connection means that the output is directly equal to the input without any additional operations such as convolution, pooling, etc. For example, FIG. 2 and FIG. 3 each contain a shortcut connection, which bypasses one or more of the convolution block (i.e., convolution+BN+ReLu) modules.

FIG. 1 illustrates a slim neural architecture designed with one or more residual modules, according to embodiments of the present disclosure. In one or more embodiments, the model 135 receives an input 105, which is entered into a first module 110. In one or more embodiments, the first module 110 comprises a convolution layer, batch normalization operation, and a rectified linear unit (ReLU) operation. As depicted, the model 135 also comprises one or more residual modules (e.g., residual modules 115 and 120) and a fully connected layer 125, which may comprise a softmax layer (not depicted), from which an output 130 is obtained.

Figure 2:
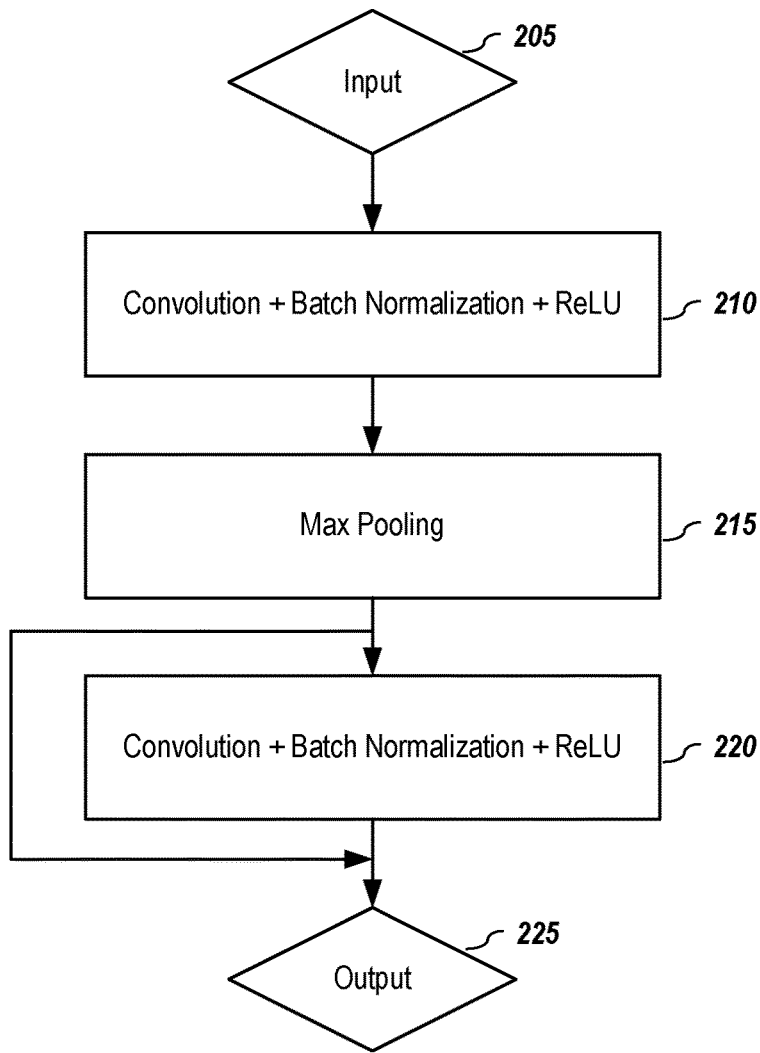
FIG. 2 graphical depicts a residual model architecture, according to embodiments of the present disclosure.

FIG. 2 depicts an example residual module, according to embodiments of the present disclosure. In the depicted embodiment, a residual module may comprise a first convolution block 210, which may comprise one or more convolution layers, batch normalization, and a rectified linear unit (ReLU). As illustrated, the residual module also includes a max pooling layer 215 and an additional convolution block 220. In one or more embodiments, an output of the max pooling layer 215 may be combined with an output of the last convolution module 220 of the residual module 200 to obtain the final output 225.

Figure 3:
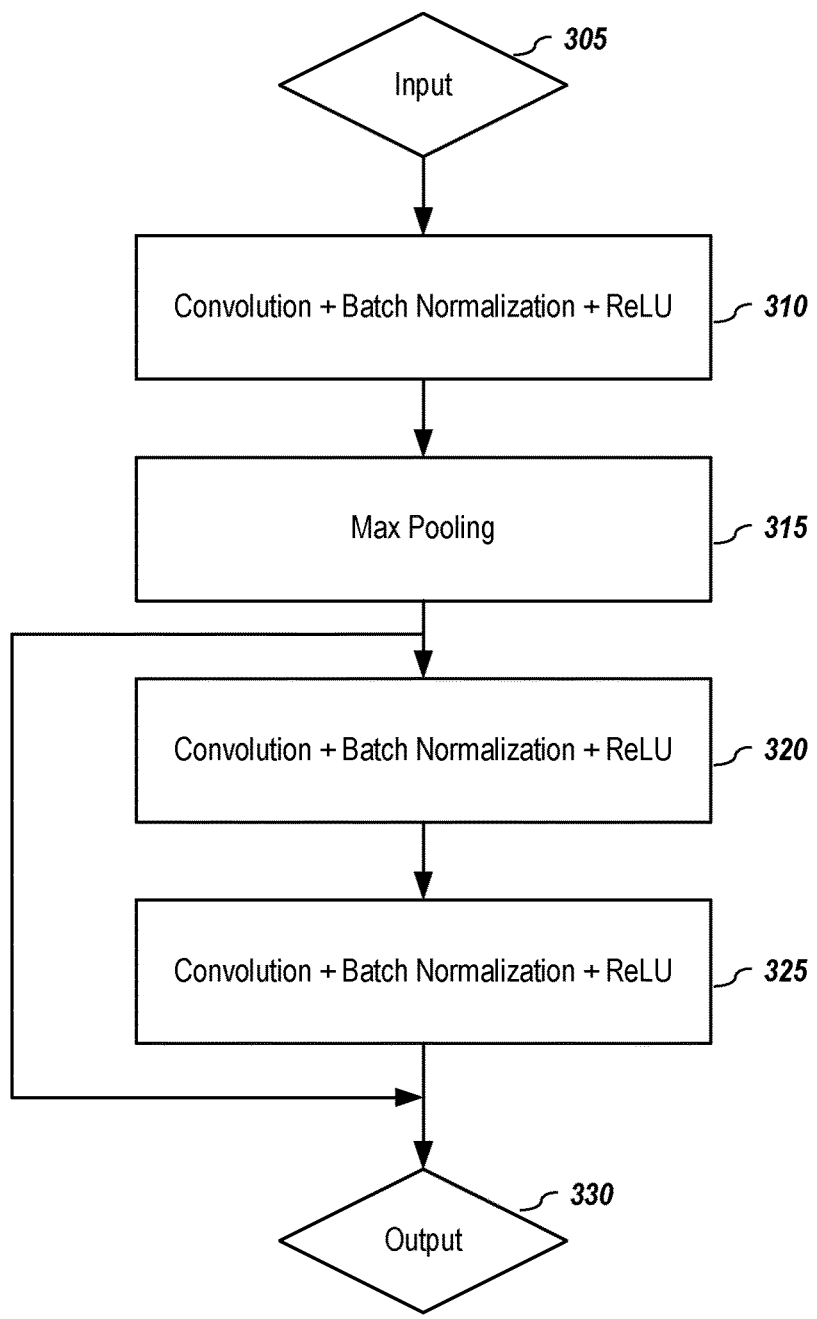
FIG. 3 graphical depicts an alternative residual model architecture, according to embodiments of the present disclosure.

FIG. 3 depicts an alternative residual module, according to embodiments of the present disclosure. In the depicted embodiment, a residual module 300 is similar to the residual module depicted in FIG. 2, but it includes two convolution modules 320 and 325 after the max pooling layer 315.

In one or more embodiments, an image classification model, such as that depicted in FIG. 1, may have a narrow width by having fewer convolution filters. Given the reduced model size, it is important that the model is structured to help increase the feature representation ability of the model. One way to improve the feature representation ability of the model is by using increasing filter sizes. For example, in one or more embodiments, the first convolution module 110 may comprise 32 filters, the first residual module (which may be an embodiment as in FIG. 3) may comprise 64 convolution filters for the first convolution module 310 and 128 filters for each of the two other convolution modules 320 and 325, the second residual module (which also may be an embodiment as in FIG. 3) may comprise 128 convolution filters for the first convolution module 310 and 256 filters for each of the two other convolution modules 320 and 325. It should be noted that other combinations and sizes of filters may be used.

C. Efficient Training Embodiments

To accelerate the learning process, embodiments of improved training processes may be used. In one or more embodiments, to help accelerate learning, an adaptive learning rate function may be used. For example, in one or more embodiments, a piecewise linear learning rate function may be used, in which the function increases linearly first to a peak point and then drops linearly to a small value that comes close to zero. By using this approach, the convergence time may be drastically reduced to about 20% percentage of its original one.

Presented below is an example adaptive learning rate function (although different learning rate functions may also be employed):

$$f(x) = \begin{cases} 0.08x & x \le 5 \\ -0.021(x-5)+0.4 & x > 5 \end{cases} \quad (1)$$

Figure 4:
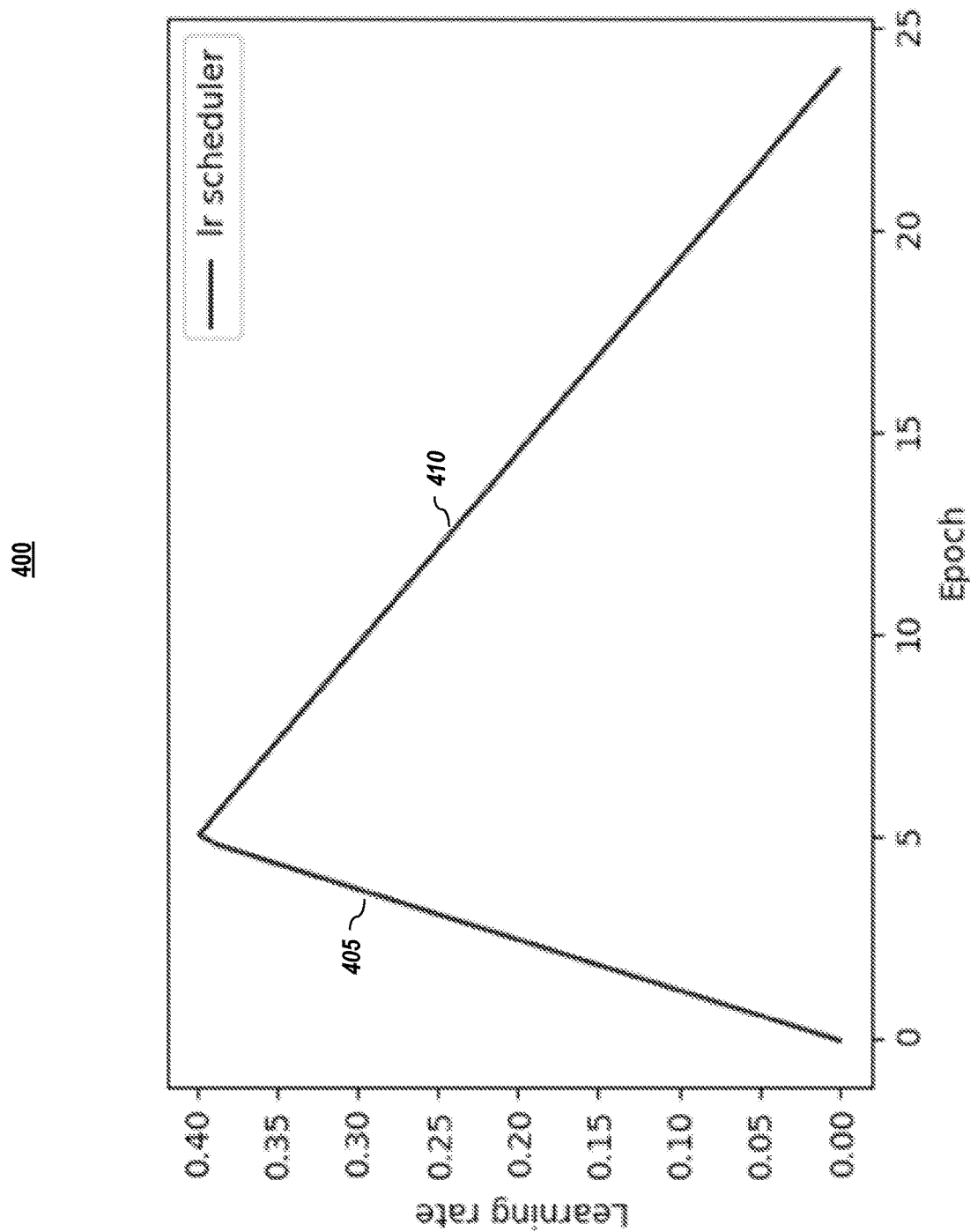
FIG. 4 graphically depicts an example learning rate, according to embodiments of the present disclosure.

FIG. 4 graphically depicts an example learning rate graph, according to embodiments of the present disclosure. In one or more embodiments, the learning rate function comprises a first linear section 405 in which the learning rate increases linearly from zero or near zero to a peak point as training epoch increases and a second linear section 410 in which the learning rate decreases linearly from a peak point (which may be a different peak point) to near zero as training epoch increases. In one or more embodiments, the magnitude of the slope of the first linear section 405 is larger than the magnitude of the slope of the second linear section 410. It shall be noted that, in one or more embodiments, the epoch learning rates may be implemented as a look-up table.

In one or more embodiment, to further accelerate the training process, a reduced bit precision training may also be utilized since it has been validated that it can efficiently make use of the GPU hardware space. For example, in one or more embodiments, half-precision floating point format (FP 16-bit) may be used to represent all the floating point numbers in all the operations in the whole training process.

In one or more embodiment, in addition to the methods discussed above, a larger batch size, such as 512 images, may be used in the training process. In determining the batch size, preferably a batch is determined such that a memory requirement for the batch is less than a memory limit of the processor, which may be a GPU or GPUs, used to train the image classification model.

Figure 5:
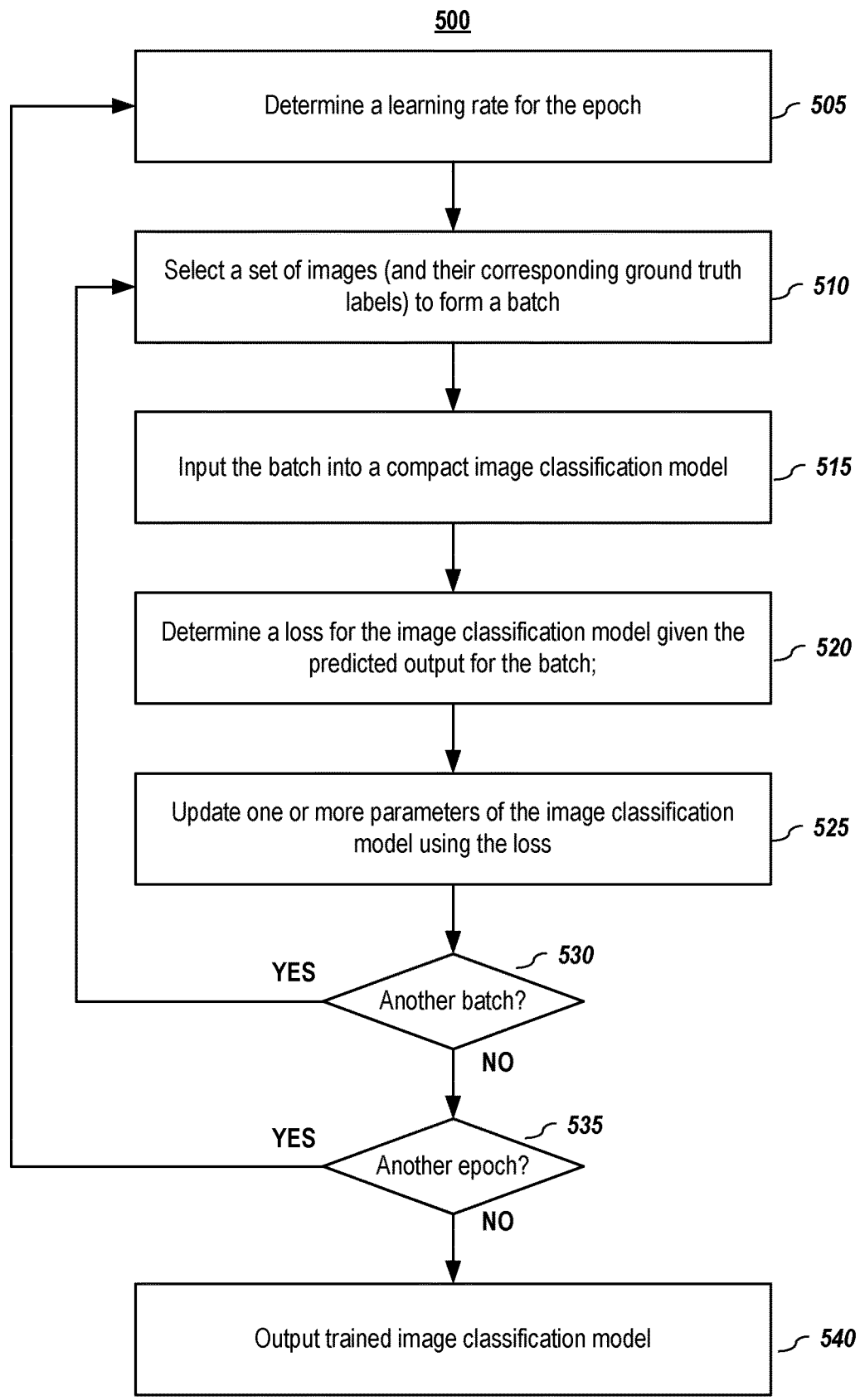
FIG. 5 graphically depicts a method for training an image classification model, according to embodiments of the present disclosure.

FIG. 5 graphically depicts a method for training an image classification model, according to embodiments of the present disclosure. In one or more embodiments, the training processes comprises determining (505) a learning rate for the epoch. As noted above, a piecewise linear function that relates training epoch number to learning rate may be used to determine the learning rate for a training epoch. A set of images and their corresponding ground truth labels may be selected (510) from one or more training datasets in order to form a batch. The batch is input (515) into an image classification model embodiment, which makes label predictions for the images in the batch. Given the output for the model, a loss for the image classification model can be determined (520). In one or more embodiments, a cross entropy loss function, which may include one or more regularization terms, is used. The loss may then be used to update (525) parameters of the image classification model. For example, in one or more embodiments, gradient descent and backpropagation may be used to update model parameters.

In one or more embodiments, steps 510-525 may be repeated (530) until an epoch has been completed. Typically, an epoch involves one pass through all the training data.

In one or more embodiments, steps 505-530 may be repeated (535) until a stop condition is reached. Examples of stop conditions include, but are not limited to, number of iterations, number of epochs, convergence of the model (e.g., the error or loss between successive iterations is less than a threshold value), divergence (e.g., the error or loss increases between successive iterations or across a set of successive iterations more than a threshold value), processing time, and the like. When the training process 500 concludes, a trained model may be output (540) for use in image classification.

It shall be noted that methodology in FIG. 5 is an example embodiment. One skilled in the art shall recognize that steps may be altered. For example, all of the learning rate values for the different epochs may be computed and converted to a look-up table for use in training. Also by way of example, instead of forming a batch in each iteration, at the start of an epoch, the training data may be randomly assigned to batches all at one time. As noted previously, the batch sizes may be selected to correspond to memory of the processing system. Other such alternations may be made, which fall within the scope of the present disclosure.

D. Image Classification with a Trained Model

Having trained the model, the trained image classification model may be used to classify one or more images. FIG. 6 depicts a method for using a trained model for image classification, according to embodiments of the present disclosure. In one or more embodiments, an unlabeled image is input (605) into the trained image classification model. The image classification model may be a slim model embodiment as discussed herein, which comprises: a convolution module comprising a convolution with a set of filters, a batch normalization operation, and an activation operation; a first residual module comprising at least two convolution modules separated by a max pooling layer; a second residual module comprising at least two convolution modules separated by a max pooling layer; and a fully connected layer that outputs the label. After the image has been input into the trained model, the model outputs (610) a predicted label for the image.

E. Computing System Embodiments

In one or more embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 7:
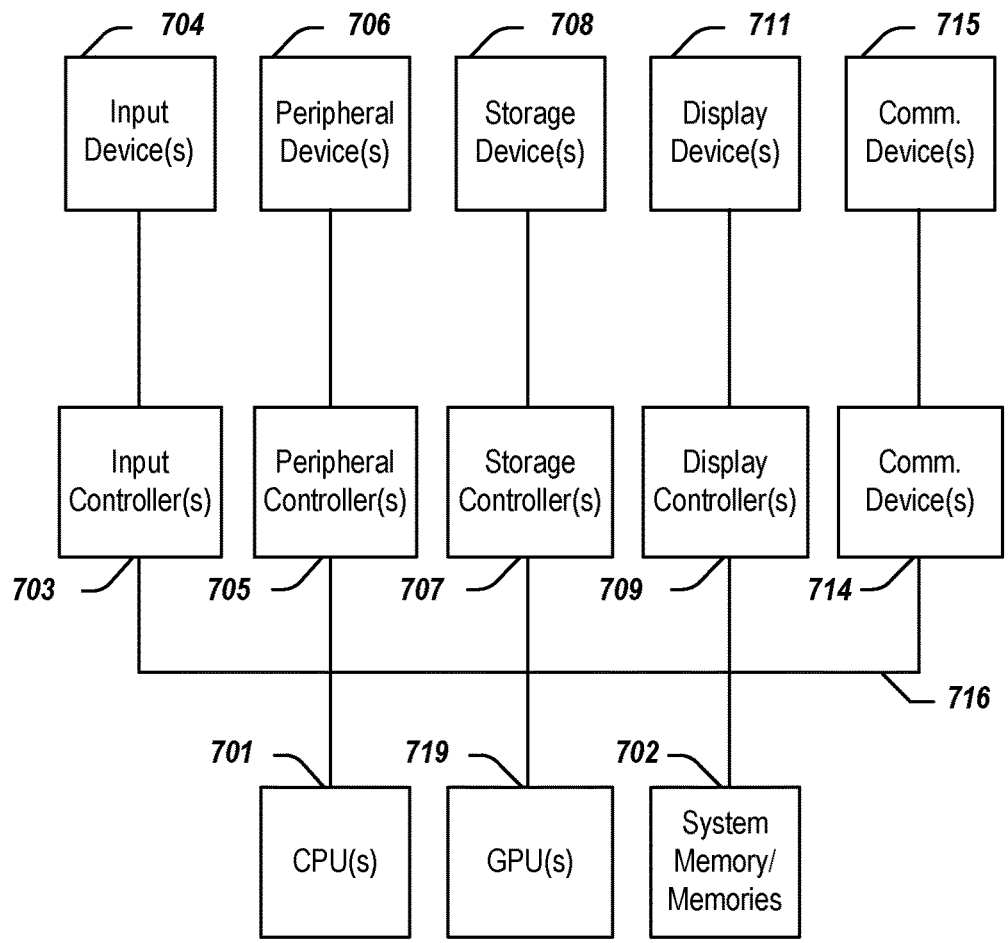
FIG. 7 depicts a simplified block diagram of a computing device/information handling system, in accordance with embodiments of the present disclosure.

FIG. 7 depicts a simplified block diagram of a computing device/information handling system (or computing system) according to embodiments of the present disclosure. It will be understood that the functionalities shown for system 700 may operate to support various embodiments of a computing system—although it shall be understood that a computing system may be differently configured and include different components, including having fewer or more components as depicted in FIG. 7.

As illustrated in FIG. 7, the computing system 700 includes one or more central processing units (CPU) 701 that provides computing resources and controls the computer. CPU 701 may be implemented with a microprocessor or the like, and may also include one or more graphics processing units (GPU) 719 and/or a floating-point coprocessor for mathematical computations. System 700 may also include a system memory 702, which may be in the form of random-access memory (RAM), read-only memory (ROM), or both.

A number of controllers and peripheral devices may also be provided, as shown in FIG. 7. An input controller 703 represents an interface to various input device(s) 704, such as a keyboard, mouse, touchscreen, and/or stylus. The computing system 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present disclosure. Storage device(s) 708 may also be used to store processed data or data to be processed in accordance with the disclosure. The system 700 may also include a display controller 709 for providing an interface to a display device 711, which may be a cathode ray tube (CRT), a thin film transistor (TFT) display, organic light-emitting diode, electroluminescent panel, plasma panel, or other type of display. The computing system 700 may also include one or more peripheral controllers or interfaces 705 for one or more peripherals 706. Examples of peripherals may include one or more printers, scanners, input devices, output devices, sensors, and the like. A communications controller 714 may interface with one or more communication devices 715, which enables the system 700 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media may include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for training an image classification model, the method comprising:
    forming one or more batches comprising images and their corresponding labels, the images and their corresponding labels being selected from one or more training datasets in which each image has a corresponding label:
    repeating, for each training epoch until a stop condition is reached, a set of steps comprising:
        inputting a batch into the image classification model, the image classification model comprising:
            a convolution module comprising a convolution with a set of filters, a batch normalization operation, and an activation operation;
            a first residual module comprising at least two convolution modules separated by a max pooling layer, in which each convolution module has its own set of filters;
            a second residual module comprising at least two convolution modules separated by a max pooling layer, in which each convolution module has its own set of filters; and a fully connected layer that receives an input obtained from an output of the second residual module;

determining a loss for the image classification model given the predicted output for the batch; and updating one or more parameters of the image classification model using the loss.

2. The computer-implemented method of claim 1 further comprising:

determining a learning rate for each training epoch.

3. The computer-implemented method of claim 2 wherein the step of determining a learning rate for each training epoch comprises:

using a piecewise linear function that relates training epoch number to learning rate to determine the learning rate for a training epoch.

4. The computer-implemented method of claim 3 wherein the piecewise linear function comprises:

a first linear section in which learning rate increases linearly from zero or near zero to a peak point as training epoch increases; and a second linear section in which learning rate decreases linearly from a peak point to near zero as training epoch increases, wherein the magnitude of the slope of the first linear section is larger than the magnitude of the slope of the second linear section.

5. The computer-implemented method of claim 1 wherein at least one of the residual modules comprise an increasing number of filters to increase feature representation of the image classification model.

6. The computer-implemented method of claim 1 wherein at least one of the first residual module and the second residual module further comprises two convolution modules after the max pooling layer.

7. The computer-implemented method of claim 1 further wherein the number of filters for a convolution is matched to processor unit parallel capabilities of a system used to train the image classification model.

8. The computer-implemented method of claim 1 wherein the number of images selected for a batch is determined such that a memory requirement of the batch is less than a memory limit of a processor unit used to train the image classification model.

9. A system for training an image classification model, the system comprising:

one or more processors; and a non-transitory computer-readable medium or media comprising one or more sets of instructions which, when executed by at least one of the one or more processors, causes steps to be performed comprising:

forming one or more batches comprising images and their corresponding labels, the images and their corresponding labels being selected from one or more training datasets in which each image has a corresponding label:

repeating, for each training epoch until a stop condition is reached, a set of steps comprising:

inputting a batch into the image classification model, the image classification model comprising:

a convolution module comprising a convolution with a set of filters, a batch normalization operation, and an activation operation;

a first residual module comprising at least two convolution modules separated by a max pooling layer, in which each convolution module has its own set of filters;

a second residual module comprising at least two convolution modules separated by a max pooling layer, in which each convolution module has its own set of filters; and a fully connected layer that receives an input obtained from an output of the second residual module;

determining a loss for the image classification model given the predicted output for the batch; and updating one or more parameters of the image classification model using the loss.

10. The system of claim 9 wherein the non-transitory computer-readable medium or media further comprises one or more sets of instructions which, when executed by at least one of the one or more processors, causes steps to be performed comprising determining a learning rate for each training epoch.

11. The system of claim 10 wherein the step of determining a learning rate for each training epoch comprises:

using a piecewise linear function that relates training epoch number to learning rate to determine the learning rate for a training epoch.

12. The system of claim 11 wherein the piecewise linear function comprises:

a first linear section in which learning rate increases linearly from zero or near zero to a peak point as training epoch increases; and a second linear section in which learning rate decreases linearly from a peak point to near zero as training epoch increases, wherein the magnitude of the slope of the first linear section is larger than the magnitude of the slope of the second linear section.

13. The system of claim 9 wherein at least one of the residual modules comprise an increasing number of filters to increase feature representation of the image classification model.

14. The system of claim 9 wherein at least one of the first residual module and the second residual module further comprises two convolution modules after the max pooling layer.

15. The system of claim 9 wherein the number of images selected for a batch is determined such that a memory requirement of the batch is less than a memory limit of the at least one processor used to train the image classification model.

16. A computer-implemented method for classifying an image, the method comprising:

inputting an input image into a classification model, the classification model comprising:

a convolution module comprising a convolution with a set of filters, a batch normalization operation, and an activation operation;

a first residual module comprising at least two convolution modules each with its own set of filters separated by a max pooling layer;

a second residual module comprising at least two convolution modules separated by a max pooling layer; and a fully connected layer; and outputting a classification label for the input image.

17. The computer-implemented method of claim 16 wherein at least one of the first residual module and the second residual module further comprises two convolution modules after the max pooling layer.

18. The computer-implemented method of claim 16 wherein at least one of the first residual module and the second residual module further comprises:

combining an output of the max pooling layer with an output of the last convolution module of the residual module.

19. The computer-implemented method of claim 16 further wherein at least some of the residual modules comprise an increasing number of filters to increase feature representation of the model.

20. The computer-implemented method of claim 16 wherein the number of filters for a convolution is matched to a processor unit's parallel capabilities that is used to train the image classification model.

* * * * *